US011509226B2

(12) United States Patent
Hosokawa et al.

(10) Patent No.: US 11,509,226 B2
(45) Date of Patent: Nov. 22, 2022

(54) POWER CONVERTER AND IMAGE PROCESSING APPARATUS

(71) Applicant: TOSHIBA TEC KABUSHIKI KAISHA, Tokyo (JP)

(72) Inventors: Yoshiaki Hosokawa, Sunto Shizuoka (JP); Yutaka Usami, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 428 days.

(21) Appl. No.: 16/828,872

(22) Filed: Mar. 24, 2020

(65) Prior Publication Data
US 2020/0358363 A1 Nov. 12, 2020

(30) Foreign Application Priority Data
May 7, 2019 (JP) .............................. JP2019-087449

(51) Int. Cl.
*H02M 1/42* (2007.01)
*H02M 3/335* (2006.01)
*H04N 1/00* (2006.01)
*H02M 1/00* (2006.01)

(52) U.S. Cl.
CPC ..... *H02M 3/33569* (2013.01); *H02M 1/4225* (2013.01); *H02M 1/4258* (2013.01); *H04N 1/00893* (2013.01); *H02M 1/0006* (2021.05); *H02M 1/4241* (2013.01)

(58) Field of Classification Search
CPC ............. H02M 1/0085; H02M 1/4225; H02M 1/4241; H02M 1/4258; H02M 3/33553
See application file for complete search history.

(56) References Cited

U.S. PATENT DOCUMENTS

| 2011/0051462 A1* | 3/2011 | Nakamura | ............... H02M 3/01 363/21.02 |
| 2012/0250360 A1* | 10/2012 | Orr | ...................... H02M 1/4225 363/21.02 |
| 2013/0336017 A1* | 12/2013 | Uno | ................... H02M 3/33507 363/21.02 |
| 2014/0211515 A1* | 7/2014 | Tomioka | ........... H02M 3/33571 363/21.02 |

(Continued)

FOREIGN PATENT DOCUMENTS

JP 2014-217144 A 11/2014

*Primary Examiner* — Gary A Nash
(74) *Attorney, Agent, or Firm* — Kim & Stewart LLP

(57) ABSTRACT

A power converter includes a first circuit including an inductor and configured to convert an input voltage into a first voltage, a second circuit including a transformer and configured to convert the first voltage input to the insulating transformer to a second voltage, a control circuit configured to control the first circuit, a first power supply circuit including a first winding magnetically coupled to the inductor and configured to output a third voltage generated by the first winding to the first control circuit, and a second power supply circuit including a second winding magnetically coupled to the transformer and configured to output a fourth voltage generated by the second winding to the first control circuit. When the second voltage is not output the third voltage is output to the control circuit, and when the second voltage is output the fourth voltage is output to the control circuit.

20 Claims, 6 Drawing Sheets

(56) References Cited

U.S. PATENT DOCUMENTS

| | | | |
|---|---|---|---|
| 2015/0229204 A1* | 8/2015 | Mao | H03K 17/165 327/109 |
| 2016/0190912 A1* | 6/2016 | Lim | G01R 21/006 363/84 |
| 2018/0054113 A1* | 2/2018 | Kim | H02M 1/4225 |

* cited by examiner

POWER CONVERTER AND IMAGE PROCESSING APPARATUS

CROSS-REFERENCE TO RELATED APPLICATIONS

This application is based upon and claims the benefit of priority from Japanese Patent Application No. 2019-087449, filed on May 7, 2019, the entire contents of which are incorporated herein by reference.

FIELD

Embodiments described herein relate generally to a power converter and an image processing apparatus.

BACKGROUND

There is a power conversion circuit comprising a power factor correction (PFC) circuit for converting a supplied pulsating voltage to a DC voltage, and a DC-DC converter for converting a voltage output from the PFC circuit to a particular DC voltage. The output DC voltage is insulated from an AC power supply form which the pulsating voltage is supplied. The DC-DC converter is, for example, an inductor-inductor-capacitor circuit (LLC circuit). Such a power conversion circuit can include a PFC control circuit for controlling the PFC circuit and an LLC control circuit for controlling the LLC circuit.

A DC voltage for operating the PFC control circuit is input from a power supply circuit including a winding that is magnetically coupled to an inductor in the PFC circuit, a smoothing diode and a capacitor. A DC voltage for operating the LLC control circuit is input from a power supply circuit including a winding that is coupled to a transformer (for example, an insulating transformer) in the LLC circuit, a smoothing diode and a capacitor.

While the current generated by the pulsating voltage flows through the inductor of the PFC circuit, the alternating current generated by the alternating voltage flows through the transformer of the LLC circuit. Therefore, the power supply circuit for supplying the DC voltage to the PFC control circuit is more lossy than the power supply circuit for supplying the DC voltage to the LLC control circuit. In other words, the former power supply circuit has a lower conversion efficiency than the latter power supply circuit.

DETAILED DESCRIPTION

In one embodiment, a power converter includes a first circuit including an inductor and configured to convert an input AC voltage into a first DC voltage, and output the first DC voltage, a second circuit including an insulating transformer and configured to convert the first DC voltage input to a primary winding of the insulating transformer to a second DC voltage and output the second DC voltage from a secondary winding of the insulating transformer, a first control circuit configured to control the first circuit, a first power supply circuit including a first winding magnetically coupled to the inductor and configured to output a third DC voltage generated by the first winding to the first control circuit, and a second power supply circuit including a second winding magnetically coupled to the insulating transformer and configured to output a fourth DC voltage generated by the second winding to the first control circuit. During output of the first DC voltage from the first circuit, when the second DC voltage is not output from the second circuit the third DC voltage is output from the first power supply circuit to the first control circuit, and when the second DC voltage is output from the second circuit the fourth DC voltage is output from the second power supply circuit to the first control circuit.

Hereinafter, certain example embodiments will be described with reference to the accompanying drawings.

Figure 1:
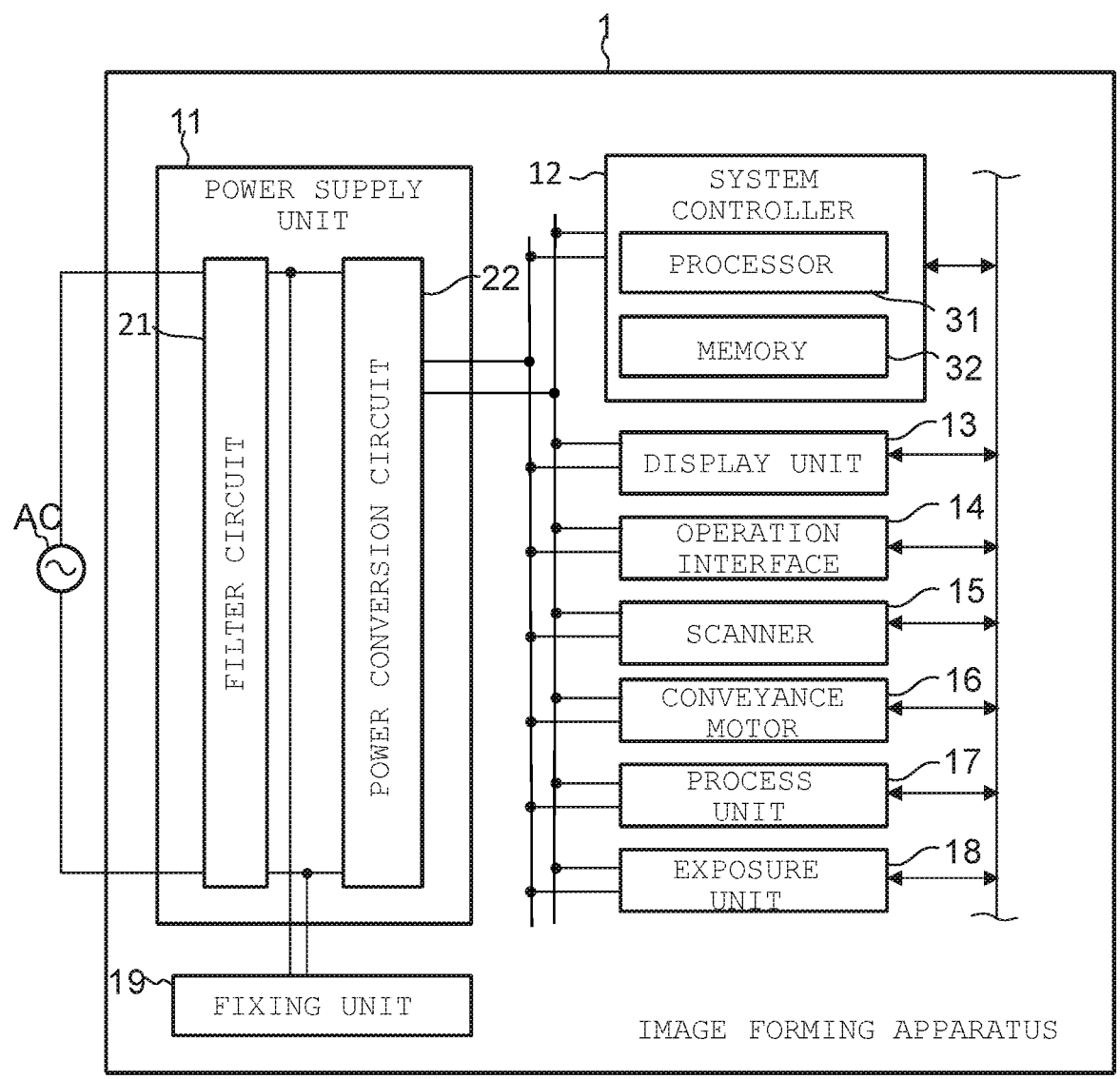
FIG. 1 is a schematic diagram of an image forming apparatus according to first and second embodiments.

FIG. 1 is a schematic diagram of an image forming apparatus 1 according to an embodiment. The image forming apparatus 1 is, for example, a multi-function printer (MFP) that performs various processes such as image formation while conveying a recording medium such as a print medium, a sheet of paper, or the like. The image forming apparatus 1 is a solid-state scanning type printer (for example, an LED printer) having an LED array.

The image forming apparatus 1 has a configuration by which toner is supplied from a toner cartridge, and an image is formed on a print medium using the supplied toner. The toner may be a monochromatic toner or color toners, such as cyan, magenta, yellow or black. Further, the toner may be a decolorable toner which can be decolorized when heat is applied thereto.

As shown in FIG. 1, the image forming apparatus 1 includes a power supply unit 11, a system controller 12, a display unit 13, an operation interface 14, a scanner 15, a conveyance motor 16, a process unit 17, an exposure unit 18, and a fixing unit 19.

The power supply unit 11 converts AC power supplied from the power supply AC (an alternating current power supply) into DC power, and supplies the DC power to the system controller 12, the display unit 13, the operation interface 14, the scanner 15, the conveyance motor 16, the process unit 17, the exposure unit 18, and the fixing unit 19. The power supply unit 11 includes a filter circuit 21 and a power conversion circuit 22.

The filter circuit 21 is a circuit for removing noise leaking from the power conversion circuit 22 to power supply AC. The filter circuit 21 is, for example, an EMC (electromagnetic compatibility) filter. The filter circuit outputs, from an output terminal side, an AC voltage having a commercial frequency 50 Hz or 60 Hz input at an input terminal side, and supplies the AC voltage to the power conversion circuit 22. The filter circuit 21 cuts off high-frequency noise generated in the power conversion circuit 22. Thus, the filter circuit 21 prevents the high-frequency noise generated in the power conversion circuit 22 from being transmitted to the power supply AC.

The power conversion circuit 22 converts the AC power supplied from the power supply AC through the filter circuit into DC power, and outputs the DC power. A detailed configuration of the power conversion circuit 22 will be described later.

The system controller 12 controls the functions of the image forming apparatus 1. The system controller 12 includes a processor 31 and a memory 32.

The processor 31 is an arithmetic element for executing arithmetic processing. The processor 31 is, for example, a CPU. The processor 31 performs various processes on the basis of programs and/or data stored in the memory 32. The processor 31 functions as a control unit capable of executing various operations by executing a program stored in the memory 32.

The memory 32 is a storage medium for storing the programs and data used by the program. The memory 32 also functions as a working memory or working space for the processor 31 executing a program or programs. That is, the memory 32 temporarily stores data being processed or utilized by the processor 31 as well as a program to be executed by the processor 31, or the like.

The processor 31 executes various kinds of information processing operations by executing a program stored in the memory 32. The processor 31 thereby generates various control signals for controlling operations of the power supply unit 11, the scanner 15, the conveyance motor 16, the process unit 17, the exposure unit 18, the fixing unit 19, and the like. The processor 31 thus controls operations of the power supply unit 11, the scanner 15, the conveyance motor 16, the process unit 17, the exposure unit 18, the fixing unit 19, and the like, using the control signals.

The display unit 13 includes a display for displaying a screen in accordance with a video signal output from a display control unit, such as system controller 12 or a graphics controller. Screens related to various settings of the image forming apparatus 1 are displayed by the display unit 13.

The operation interface 14 can be connected to an operation device. The operation interface 14 supplies operation signals to the system controller 12 that correspond to the operations of a connected operation device to the system controller 12. For example, the operation device can be a user input device such as a touch sensor, a numeric keypad, a power button, a paper feed key, various function keys, buttons, or switches, a keyboard, or the like. In general, a touch sensor acquires information indicating a position specified by an operator in a certain region of screen or panel by touch. The touch sensor can be a touch panel integrated with the display unit 13, whereby a signal indicating a touched position on a screen displayed on the display unit 13 can be input to the system controller 12.

The scanner 15 includes an image sensor, a light source, an optical element, and the like. In the image sensor, photodiodes or pixels for converting light into electric signals (also referred to as image signals) are arranged in a line. The image sensor is composed of a Charge Coupled Device (CCD), a Complementary Metal Oxide Semiconductor (CMOS), or other imaging device. The light source illuminates the object being scanned. The optical element focuses light reflected by the object being scanned onto the pixels of the image sensor. Thus, the scanner 15 thus acquires an image of the object being scanned.

The conveyance motor 16 drives a conveyance mechanism for transporting a printing medium along a conveyance path. The conveyance path includes a plurality of rollers and a plurality of guides. The rollers are rotated by a conveyance motor 16. Based on the control of the system controller 12, the conveyance motor 16 rotates a shaft to rotate the rollers associated with the rotation of the shaft. The rollers are rotated to move the print medium along the conveyance path for printing by the image forming apparatus 1. The plurality of guides can be used to control the conveying direction and position of the print medium along the conveyance path.

A process unit 17 forms a toner image according to print data or the like. A process unit 17 can be provided for each type (e.g., each color) of toner utilized in the image forming apparatus 1. A toner cartridge can be connected to a process unit 17. Each process unit 17 in this example includes a photosensitive drum, an electrostatic charger, and a developing device.

The photosensitive drum is a photoreceptor. The photosensitive drum has a photosensitive layer formed on an outer peripheral surface of the drum. The electrostatic charger charges the surface of the photosensitive drum. The developing device is a device that supplies toner to be adhered to the charged surface of the photosensitive drum.

The exposure unit 18 includes a plurality of light emitting elements. The exposure unit 18 emits light from the light emitting elements onto the charged photosensitive drum so as to form a latent image on the photosensitive drum according to print data or the like. The light-emitting element is, for example, a light-emitting diode (LED). Each light emitting element is configured to emit light to a different point on the photosensitive drum. The plurality of light emitting elements are arranged along the main scanning direction, which is parallel to the rotation axis of the photosensitive drum.

The exposure unit 18 forms the latent image line-by-line as the photosensitive drum rotates in the sub-scanning direction.

In the above structure, as light from the exposure unit 18 selectively hits the surface of the charged photosensitive drum, an electrostatic latent image is formed corresponding to exposed and unexposed regions. The developing device attaches toner to the charged portions of the electrostatic latent image formed on the surface of the photosensitive drum. As a result, a toner image is formed on the surface of the photosensitive drum corresponding to the electrostatic latent image.

The toner image formed on the surface of the photosensitive drum is then transferred to the surface of the printing medium by a transfer mechanism including a transfer belt, a transfer roller, and the like. That is, the process unit 17, the exposure unit 18, and the transfer mechanism comprise an image forming unit that forms a toner image on a print medium.

The fixing unit 19 fixes the transferred toner image onto the print medium. The fixing unit 19 includes a heater, a heating member heated by a heater, and a pressing member for applying pressure to the printing medium together with the heating member. The heater of the fixing unit 19 generates heat using the electric power supplied from the power supply unit 11, and thereby heats the heating member. The heater of the fixing unit 19 can be a halogen lamp heater, an inductive heating (IH) heater, or the like. The pressing member applies pressure to the heating member by a force applied from a tension or spring member. When pressure is applied to the heating member from the pressing member, a fixing nip at which the pressing member and the heating member are brought into close contact with each other is formed. The pressing member is rotated by a motor. The pressing member moves the printing medium through the fixing nip while pressing the printing medium against the heating member.

With the arrangement described above, the pressing member and the heating member apply heat and pressure to a printing medium passing through the fixing nip. The toner on the printing medium is fused or melted by the heat and the pressure. Thus, the toner image is fixed to the print medium.

First Embodiment

Next, a configuration of the power conversion circuit 22 of the power supply unit 11 according to the first embodiment will be described.

Figure 2:
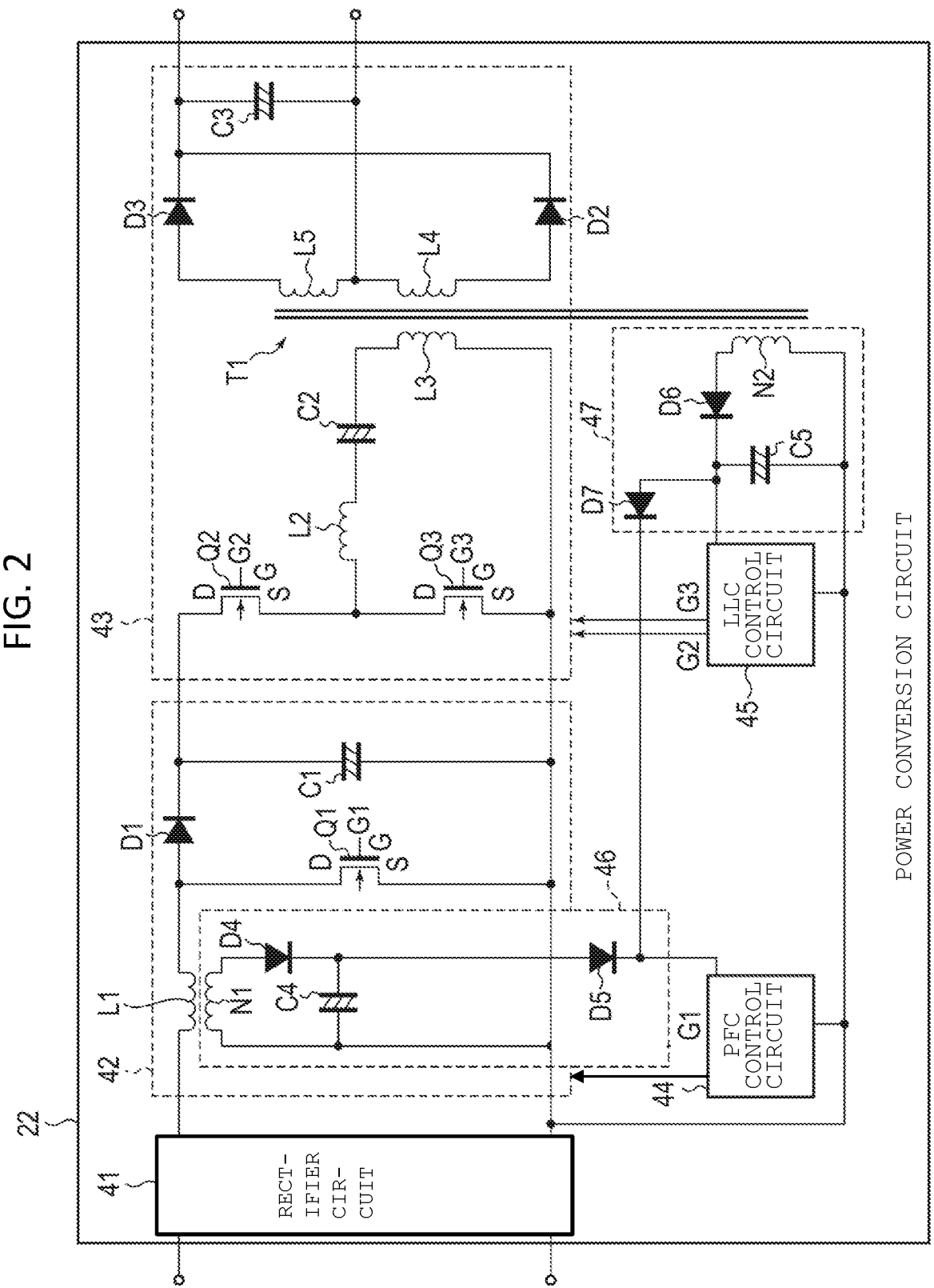
FIG. 2 is a circuit diagram of a power conversion circuit according to the first embodiment.

FIG. 2 is a circuit diagram of the power conversion circuit 22. The power supply AC is connected to the power conversion circuit 22 via a filter circuit 21. The power conversion circuit 22 switches the AC voltage of the power supply AC at a high frequency to supply a particular DC voltage to each load of the image forming apparatus 1.

The power conversion circuit 22 includes a rectifier circuit 41, a PFC circuit 42, an LLC circuit 43, a PFC control circuit 44, an LLC control circuit 45, a first power supply circuit 46, and a second power supply circuit 47. That is, the power conversion circuit 22 is a power supply circuit of a two stage system type.

The rectifier circuit 41 rectifies the AC voltage input from the power supply AC via the filter circuit 21, and supplies a DC voltage to the circuit in the subsequent stage. That is, the rectifier circuit 41 converts the AC voltage into a pulsating voltage, and supplies this voltage to the PFC circuit 42. The rectifier circuit 41 in this example is a full-wave rectifier circuit including a plurality of diodes.

The PFC circuit 42 is connected to output terminals of the rectifier circuit 41. The PFC circuit 42 includes an inductor L1, a switching element Q1, a diode D1, and a smoothing capacitor C1.

The inductor L1 is connected between one output terminal of the rectifier circuit 41 and the anode of the diode D1. The cathode of the diode D1 is connected to the high potential side terminal of the smoothing capacitor C1.

The switching element Q1 is an element which is turned on and off under the control of the PFC control circuit 44. The switching element Q1 is turned on and off by a gate signal G1 supplied from the PFC control circuit 44. The switching element Q1 can be an FET made of a wide bandgap semiconductor, such as SiC, GaN, gallium oxide, or diamond. The switching element Q1 may be a MOSFET made of silicon in some examples. The drain of the switching element Q1 is connected to the inductor L1 and the anode of the diode D1. The source of the switching element Q1 is connected to the low potential side terminal of the smoothing capacitor C1.

The PFC circuit 42 boosts the output voltage of the rectifier circuit 41 by turning on and off the switching element Q1, and charges the smoothing capacitor C1. That is, the smoothing capacitor C1 supplies the voltage at which the output voltage of the rectifying circuit 41 is boosted, to a circuit in the subsequent stage, e.g., the LLC circuit 43.

The LLC circuit 43 is connected to the rear stage of the PFC circuit 42. The LLC circuit 43 is a kind of DC-DC converter that converts the DC voltage supplied from the PFC circuit 42 to a DC voltage necessary for a load. The LLC circuit 43 includes a switching element Q2, a switching element Q3, an inductor L2, a resonance capacitor C2, a winding L3, a winding L4, a winding L5, a diode D2, a diode D3, and a smoothing capacitor C3. In some examples, the diode D2 and the diode D3 may be formed by a synchronous rectification method using a MOSFET.

The switching element Q2 and the switching element Q3 are turned on and off under the control of the LLC control circuit 45. The switching element Q2 and the switching element Q3 are, for example, MOSFETs made of silicon. The switching element Q2 is a high-side switch which is turned on and off by a gate signal G2 supplied from the LLC control circuit 45. The switching element Q3 is a low-side switch which is turned on and off by a gate signal G3 supplied from the LLC control circuit 45.

The drain terminal of the switching element Q2 is connected to one output terminal of the PFC circuit 42, in particular the high potential side terminal of the smoothing capacitor C1 in this example. The source terminal of the switching element Q3 is connected to the other output terminal of the PFC circuit 42, in particular, the low potential side terminal of the smoothing capacitor C1 in this example, and the drain terminal of the switching element Q3 is connected to the source terminal of the switching element Q2. The inductor L2, the resonance capacitor C2, and the winding L3 are connected in series between the switching element Q2 and the switching element Q3 and between the switching element Q3 and the source terminal of the switching element Q2.

The winding L3, the winding L4, and the winding L5 make up an insulating transformer T1. The winding L3 is on a first side of the insulation transformer T1, and the winding L4 and the winding L5 are on a secondary side of the insulating transformer T1. The winding L4 and the winding L5 are insulated from the winding L3, and are excited by the magnetic field generated in the winding L3. The winding L4 and the winding L5 are connected to each other. The insulating transformer T1 is configured such that the winding ratio between the winding L3 and the winding L4 and the winding ratio between the winding L3 and the winding L5 are equal to each other. The connection point between the winding L4 and the winding L5 is connected to the low potential side terminal of the smoothing capacitor C3.

The diode D2 has an anode connected to the winding L4, and a cathode connected to the high potential side terminal of the smoothing capacitor C3. The anode of the diode D3 is connected to the winding L5, and the cathode thereof is connected to the high-potential terminal of the smoothing capacitor C3.

With the configuration as described above, the switching element Q2 and the switching element Q3 are alternately turned on and off, and the alternating voltage is applied to the winding L3 by the resonance operation of the inductor L2 and the resonance capacitor C2. As a result, an alternating current equivalent to that of the winding L3 flows through the inductor L2. As a result, a magnetic field which changes in accordance with the alternating current is generated in the insulating transformer T1. The induced voltage is generated in the winding L4 and the winding L5 due to a change in the magnetic field generated in the insulating transformer T1 (i.e., change in magnetic flux). The induced voltage causes the alternating current to flow through the winding L4 and the winding L5. Specifically, the positive half-wave portion of the alternating current flows to the winding L4, and the negative half-wave portion of the alternating current flows to the winding L5. In other words, currents having opposite phases to each other flow through the winding L4 and the winding L5 are caused to flow in the opposite phase to each other. The electric current generated in the winding L4 is rectified by the diode D2, and the smoothing capacitor C3 is charged. The current generated in the winding L5 is rectified by the diode D3, and the smoothing capacitor C3 is charged. Thus, the DC power (DC voltage DCV) is supplied to the load connected to the smoothing capacitor C3.

The PFC control circuit 44 generates a gate signal G1 for turning on and off the switching element Q1 of the PFC circuit 42, and inputs the gate signal G1 to the gate of the switching element Q1. The PFC control circuit 44 switches the switching element Q1 such that the input current is close to the sine wave.

The LLC control circuit 45 generates a gate signal G2 for turning on and off the switching element Q2 of the LLC circuit 43, and inputs the gate signal G2 to the gate of the switching element Q2. Further, the LLC control circuit 45 generates a gate signal G3 for turning on and off the switching element Q3 of the LLC circuit 43, and inputs the gate signal G3 to the gate of the switching element Q3. The LLC control circuit 45 alternately turns on and off the switching element Q2 and the switching element Q3. Thus, the alternating voltage is applied to the winding L3 by the resonance operation of the inductor L2 of the LLC circuit 43 and the resonance capacitor C2. As a result, an alternating current flows through the winding L3, and a magnetic field is generated.

The first power supply circuit 46 and the second power supply circuit 47 are power supply circuits for supplying DC voltages to the PFC control circuit 44 and the LLC control circuit 45. The first power supply circuit 46 supplies a DC voltage PFCVcc, which is a voltage for operating the PFC control circuit 44, to the PFC control circuit 44 based on the magnetic field generated in the inductor L1 of the PFC circuit 42. The first power supply circuit 46 includes an auxiliary winding N1, a diode D4, a smoothing capacitor C4, and a diode D5.

The auxiliary winding N1 is a winding which is magnetically coupled to the inductor L1 of the PFC circuit 42. A current generated by the pulsating voltage applied from the rectifier circuit 41 flows through the inductor L1. The auxiliary winding N1 is excited in accordance with a magnetic field generated by a current flowing through the inductor L1, thereby generating electric power.

The diode D4 has an anode connected to the auxiliary winding N1, and a cathode connected to the high potential side terminal of the smoothing capacitor C4.

The smoothing capacitor C4 is connected in parallel with the auxiliary winding N1 via the diode D4. The smoothing capacitor C4 is charged by a current, which is generated by a voltage generated in the auxiliary winding N1 and rectified by the diode D4. The smoothing capacitor C4 is connected in parallel to the power supply input terminal of the PFC control circuit 44 via the diode D5.

The diode D5 has an anode connected to the high potential side terminal of the smoothing capacitor C4, and a cathode connected to a power input terminal of the PFC control circuit 44.

According to the configuration described above, the first power supply circuit 46 receives electric power from the PFC circuit 42 by the auxiliary winding N1, rectifies and smooths the received electric power, and generates a DC voltage PFCVcc. The first power supply circuit 46 supplies the DC voltage PFCVcc to the power supply input terminal of the PFC control circuit 44.

The second power supply circuit 47 supplies a DC voltage LLCVcc, which is a voltage for operating the LLC control circuit 45, to the LLC control circuit 45 based on the magnetic field generated in the insulating transformer T1 of the LLC circuit 43, and also supplies the DC voltage LLCVcc to the PFC control circuit 44. The second power supply circuit 47 includes an auxiliary winding N2, a diode D6, a smoothing capacitor C5, and a diode D7.

The auxiliary winding N2 is a winding which is magnetically coupled to the insulating transformer T1 of the LLC circuit 43. The alternating current generated by turning on and off the switching element Q1 and the switching element Q3 flows in the winding L3 of the insulating transformer T2. The auxiliary winding N1 is excited in accordance with a magnetic field generated in the insulating transformer T2 to generate electric power.

The diode D6 has an anode connected to the auxiliary winding N2, and a cathode connected to the high potential side terminal of the smoothing capacitor C5.

The smoothing capacitor C5 is connected in parallel with the auxiliary winding N2 via the diode D6. The smoothing capacitor C5 is charged by a current, which is generated by a voltage generated in the auxiliary winding N2 and rectified by the diode D6. The smoothing capacitor C5 is connected in parallel to the power supply input terminal of the LLC control circuit 45.

According to the configuration described above, the second power supply circuit 47 receives electric power from the LLC circuit 43 by the auxiliary winding N2, rectifies and smooths the received electric power, and generates a DC voltage LLCVcc. The second power supply circuit 47 supplies the DC voltage LLCVcc to the power supply input terminal of the LLC control circuit 45.

The anode of the diode D7 is connected to the high-potential terminal of the smoothing capacitor C5, and the cathode of the diode D7 is connected to the power input terminal of the PFC control circuit 44. That is, the smoothing capacitor C5 is also connected in parallel to the power input terminal of the PFC control circuit 44 via the diode D7.

According to the configuration described above, the second power supply circuit 47 also supplies the DC voltage LLCVcc to the power input terminal of the PFC control circuit 44. Note that the DC voltage LLCVcc from the second power supply circuit 47 is not supplied to the PFC control circuit 44 when the DC voltage PFCVcc is greater than or equal to DC voltage LLCVcc, and is supplied to the PFC control circuit 44 when the DC voltage PFCVcc is less than the DC voltage LLCVcc.

Next, the operation of the power conversion circuit 22 will be described.

Figure 3:
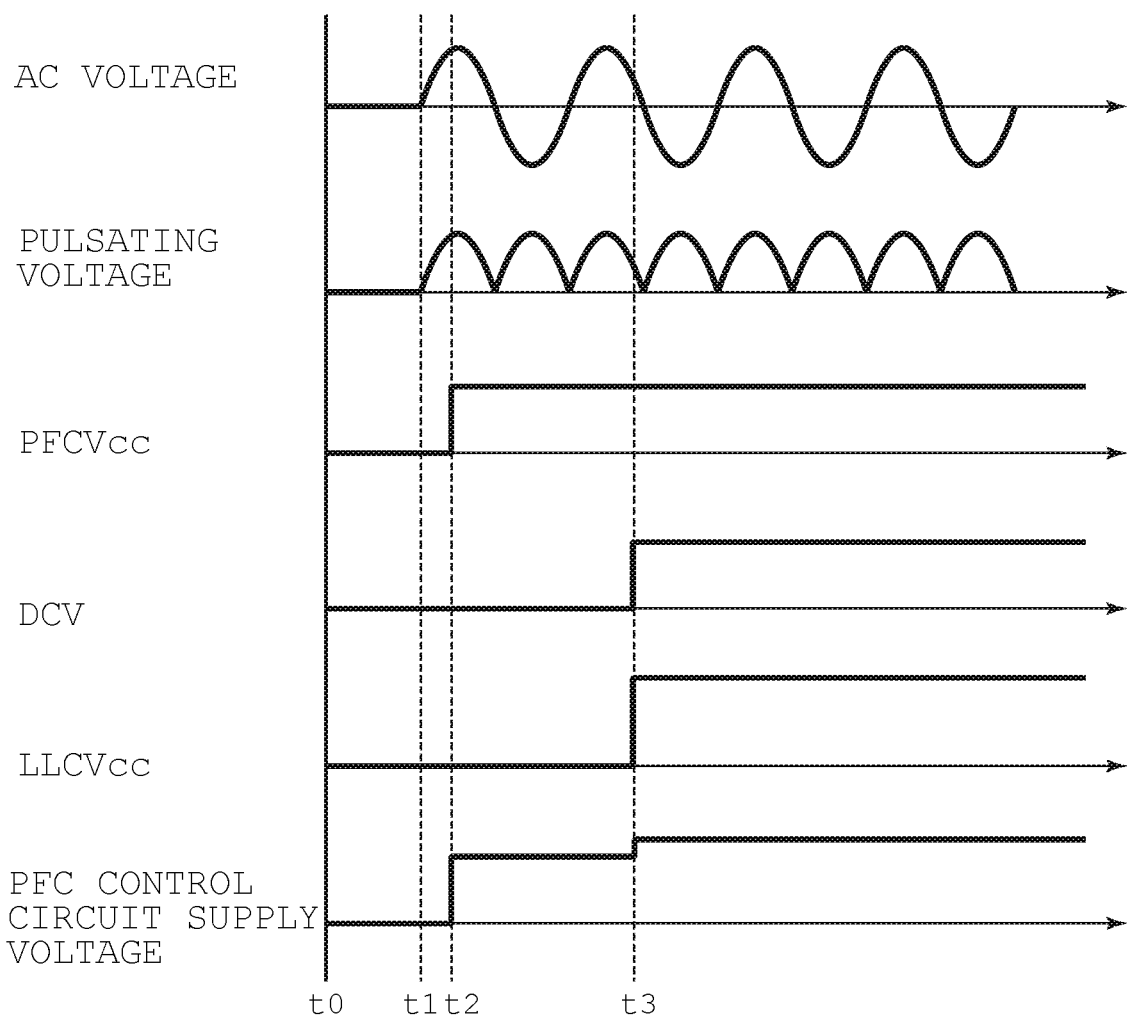
FIG. 3 is a diagram for explaining the operation of the power conversion circuit according to the first embodiment.

FIG. 3 is a diagram for explaining the operation of the power conversion circuit 22. FIG. 3 shows the relationship between the AC voltage supplied from the power supply AC via the filter circuit 21, the pulsating voltage supplied from the rectifier circuit 41, the DC voltage PFCVcc from the first power supply circuit 46, the DC voltage DCV as the output of the power conversion circuit 22, the DC voltage LLCVcc from the second power supply circuit 47, and the voltage supplied to the PFC control circuit 44.

At timing t0, the AC voltage is not being supplied. The AC voltage is started to be supplied at timing t1. The AC voltage is converted to the pulsating voltage by the rectifier circuit 41, and supplied to the PFC circuit 42, so that the inductor L1 of the PFC circuit 42 is rendered conductive.

When the inductor L1 is turned on, a voltage is generated in the auxiliary winding N1 of the first power supply circuit 46 due to the magnetic field generated in the inductor L1. The generated voltage is rectified and smoothed by the diode D4 and the smoothing capacitor C4. This rectified and smoothed voltage is the DC voltage PFCVcc and is output at timing t2 and supplied to the PFC control circuit 44 via the diode D5. Therefore, at the timing t2, the voltage supplied to the PFC control circuit 44 is the DC voltage PFCVcc. At this point in time, the LLC circuit 43 is not yet activated.

Next, when the PFC control circuit 44 is activated and a high voltage is applied to the smoothing capacitor C1, the LLC circuit 43 is activated at the timing t3. When the LLC circuit 43 is activated, electric power is supplied to the second side from the first side of the insulating transformer T1, and the DC voltage DCV is output from the power conversion circuit 22.

At the same time as the DC voltage DCV is being output from the power conversion circuit 22, a voltage is generated in the auxiliary winding N2 of the second power supply circuit by the magnetic field generated in the insulating transformer T1. This generated voltage is rectified and smoothed by the diode D6 and the smoothing capacitor C5. This rectified and smoothed voltage is the DC voltage LLCVcc and is output at timing t3 and supplied to the LLC control circuit 45 to begin the steady-state operation(s).

The DC voltage LLCVcc from the second power supply circuit 47 is also supplied to the PFC control circuit 44 when the DC voltage LLCVcc is greater than the DC voltage PFCVcc. Therefore, at the timing t3, the voltage supplied to the PFC control circuit 44 is increased from the DC voltage PFCVcc to the DC voltage LLCVcc. The DC voltage LLCVcc from the second power supply circuit 47 is blocked so as not to be applied to the first power supply circuit 46 by the diode D5. In the steady-state operation period during which the DC voltage LLCVcc is supplied to the PFC control circuit 44 from the second power supply circuit 47 after the timing t3, the DC voltage PFCVcc of the first power supply circuit 46 is not supplied to the outside from the closed circuit of the auxiliary winding N1, the smoothing capacitor C4, and the diode D4.

The DC voltage PFCVcc from the first power supply circuit 46 is determined by the pulsating voltage applied to the inductor L1 and the ratio of the number of turns of the auxiliary winding N1 to the inductor L1. The DC voltage LLCVcc from the second power supply circuit 47 is determined by the alternating voltage applied to the winding L1 of the insulating transformer T3 and the ratio of the winding number of the auxiliary winding N2 to the winding L3. Therefore, the ripple voltage applied to the inductor L1, the number ratio of the auxiliary winding N1 to the inductor L1, the alternating voltage applied to the winding L1 of the insulating transformer T3, and the winding number ratio of the auxiliary winding N2 to the winding L3 are set so that the DC voltage LLCVcc is greater than the DC voltage PFCVcc.

As described above, the current generated by the pulsating voltage flows through the inductor L1 of the PFC circuit 42, while the alternating current generated by the alternating voltage flows through the insulating transformer T1 of the LLC circuit 43. For this reason, the first power supply circuit 46 is more lossy than the second power supply circuit 47, that is, the conversion efficiency is inferior.

Therefore, when the PFC circuit 42 is activated and the LLC circuit 43 is not activated, the power supply circuit of the power conversion circuit 22 of the first embodiment supplies the DC voltage to the PFC control circuit 44 by the voltage generated in the first auxiliary winding N1 that is magnetically coupled to the inductor L1, and when the LLC circuit 43 is activated, the DC voltage is supplied to the PFC control circuit 44 by the voltage generated in the second auxiliary winding N2 that is magnetically coupled to the insulating transformer T1. For this purpose, the second power supply circuit 47 is designed such that the DC voltage LLCVcc is greater than the DC voltage PFCVcc during the steady-state operation. Thus, the second power supply circuit 47 supplies the DC voltage LLCVcc to the PFC control circuit 44 and the LLC control circuit 45 in the steady-state operation. Moreover, the first power supply circuit 46 does not output the DC voltage PFCVcc during the steady-state operation. As a result, the loss in the power conversion circuit 22 can be reduced.

In addition, the first power supply circuit 46 includes the diode D5 having the cathode connected to the PFC control circuit 44. Thus, it is possible to prevent the DC voltage LLCVcc from the second power supply circuit 47 from being applied to the smoothing capacitor C4.

In addition, the second power supply circuit 47 includes the diode D7 having the cathode connected to the PFC control circuit 44. Thus, it is possible to prevent the DC voltage PFCVcc from the first power supply circuit 46 from being applied to the smoothing capacitor C5.

For example, a current of 50 mA flows through the PFC control circuit 44 and the LLC control circuit 45 when PFCVcc is 15 V and LLCVcc is 17 V. Further, the conversion efficiency for generating the DC voltage PFCVcc from the auxiliary winding N1 is 50%, and the conversion efficiency for generating the DC voltage LLCVcc from the auxiliary winding N2 is 80%. In this case, the power consumption is calculated as follows.

(1) The PFC control circuit 44 is driven with PFCVcc=15 V, and the LLC control circuit 45 is driven with LLCVcc=17 V.

Power consumption=15 [V]×50 [mA]/0.5=1.5 [W] in the PFC control circuit 44.

Power consumption=17 [V]×50 [mA]/0.8=1.0625 [W] in LLC control circuit 45.

Total power consumption=1.5+1.0625=2.5625 [W].

(2) The PFC control circuit 44 and the LLC control circuit 45 are driven with LLCVcc=17 V.

Power consumption=17 [V]×50 [mA]/0.8=1.0625 [W] in the PFC control circuit 44.

Power consumption=17 [V]×50 [mA]/0.8=1.0625 [W] in LLC control circuit 45.

Total power consumption=1.0625+1.0625=2.125 [W]

As described above, a power consumption difference between (1) and (2) is 2.5625−2.125=0.4375 [W].

Second Embodiment

Next, a detailed configuration of a power conversion circuit 22A according to a second embodiment will be described.

Figure 4:
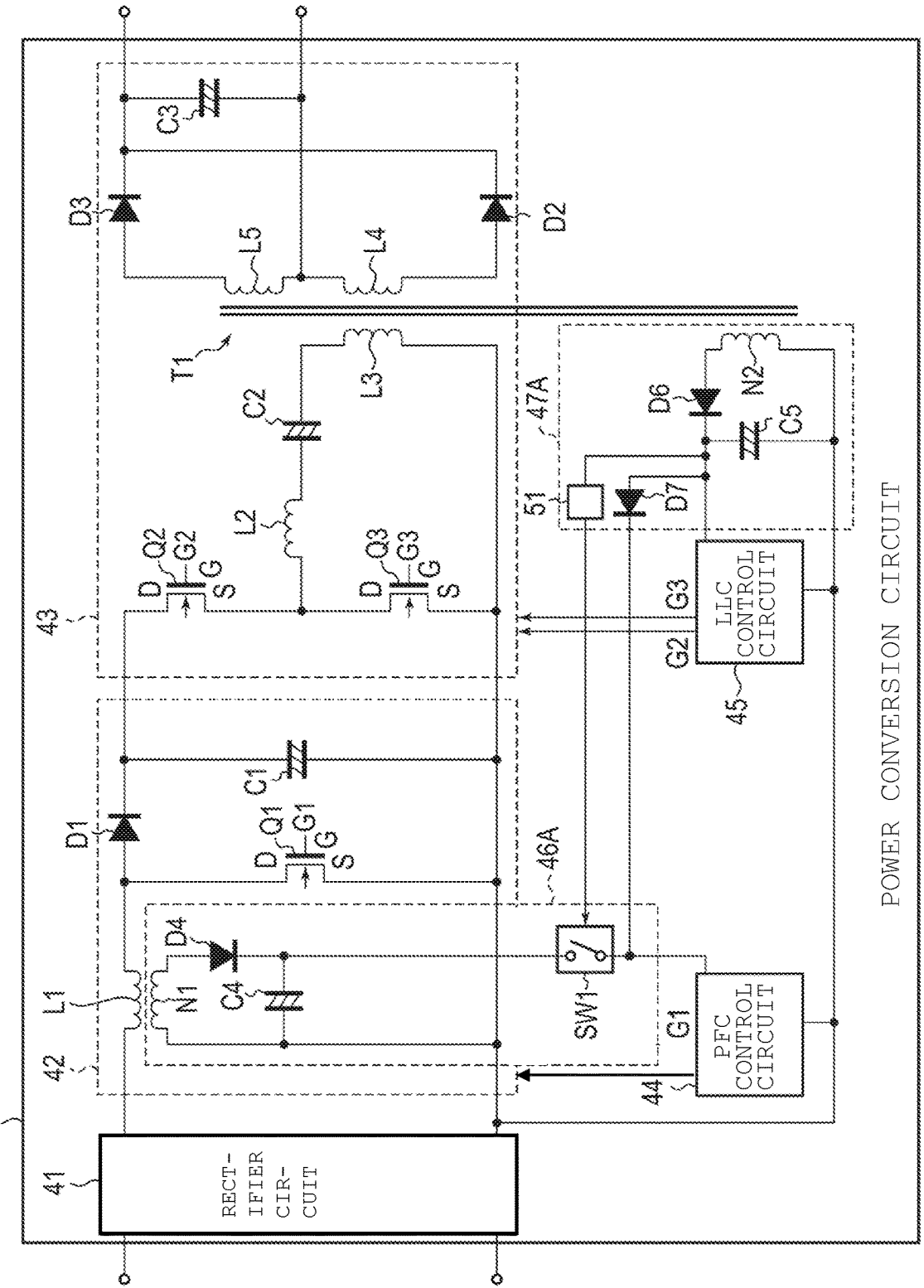
FIG. 4 is a circuit diagram of a power conversion circuit according to the second embodiment.

FIG. 4 is a circuit diagram of the power conversion circuit 22A. The power conversion circuit 22A is different from the power conversion circuit 22 according to the first embodiment in the configurations of the first power supply circuit 46 and the second power supply circuit 47. Elements corresponding to the first power supply circuit 46 and the second power supply circuit 47 in the second embodiment are referred to as a first power supply circuit 46A and a second power supply circuit 47A, respectively. The same reference numerals are used to designate the same components as those in the first embodiment, and the description thereof will not be repeated.

The first power supply circuit 46A includes an auxiliary winding N1, a diode D4, a smoothing capacitor C4, and a switch element SW1.

The switch element SW1 is an element that connects the smoothing capacitor C4 and the PFC control circuit 44 when the switch element SW1 is turned on, and disconnects the smoothing capacitor C4 and the PFC control circuit 44 when the switch element SW1 is turned off. The switch element SW1 is turned on and off under the control of the second power supply circuit 47A. The switch element SW1 can be a normally-on switch that is on (closed) when the control signal from the second power supply circuit 47A is at the L level, and off (open) when the control signal from the second power supply circuit 47A is at the H level. The switch element SW1 is, for example, a relay switch, but may be any type of switch.

The second power supply circuit 47A includes an auxiliary winding N2, a diode D6, a diode D7, a smoothing capacitor C5, and a voltage detection circuit 51.

The voltage detection circuit 51 is a circuit that detects the voltage of the smoothing capacitor C5 and outputs the detection result to the first power supply circuit 46A as a control signal for switching on and off the switch element SW1. When the voltage of the smoothing capacitor C5 is equal to or more than a preset threshold value, the voltage detection circuit 51 outputs a signal of the H level to the switch element SW1. In addition, when the voltage of the smoothing capacitor C5 is less than the preset threshold value, the voltage detection circuit 51 outputs a signal of the L level to the switch element SW1.

Figure 5:
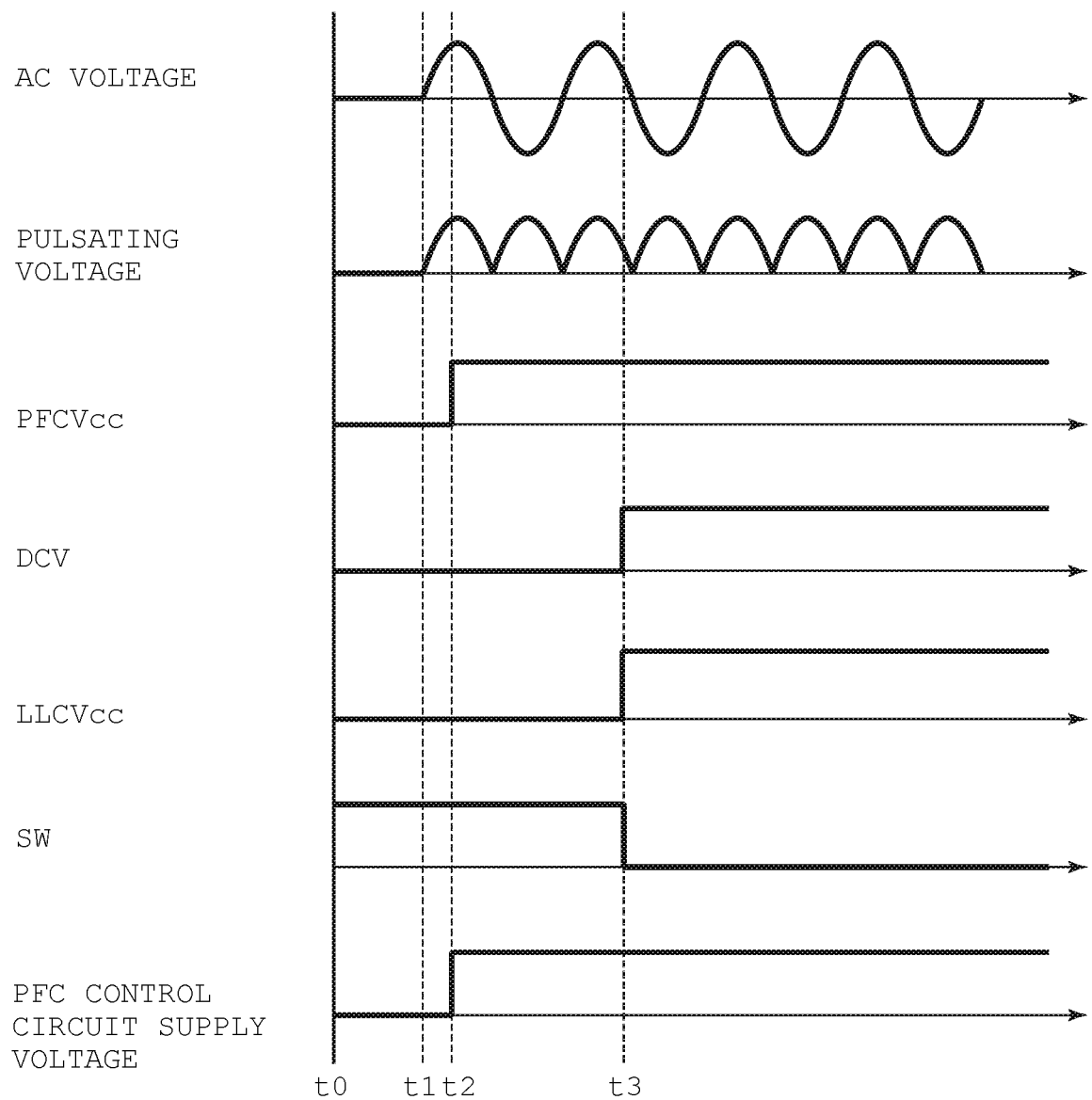
FIG. 5 is a diagram for explaining the operation of the power conversion circuit according to the second embodiment.

FIG. 5 is a diagram for explaining the operation of the power conversion circuit 22A. FIG. 5 shows the relationship between the AC voltage supplied from the power supply AC via the filter circuit 21, the pulsating voltage supplied from the rectifier circuit 41, the DC voltage PFCVcc from the first power supply circuit 46A, the DC voltage DCV as the output of the power conversion circuit 22, the DC voltage LLCVcc from the second power supply circuit 47A, the on/off state of the switch element SW1, and the voltage supplied to the PFC control circuit 44.

At timing t0, the AC voltage is yet being not supplied. The AC voltage starts to be supplied at timing t1. In this case, the AC voltage is converted to the pulsating voltage by the rectifier circuit 41, and supplied to the PFC circuit 42, so that the inductor L1 of the PFC circuit 42 is rendered conductive.

When the inductor L1 is turned on, a voltage is generated in the auxiliary winding N1 of the first power supply circuit 46A by the magnetic field generated in the inductor L1. The generated voltage is rectified and smoothed by the diode D4 and the smoothing capacitor C4. This generated and rectified voltage is supplied as the DC voltage PFCVcc at the timing t2. At this time, since the LLC circuit 43 is not operating, the smoothing capacitor C5 of the second power supply circuit 47A is not charged. Therefore, the control signal from the voltage detection circuit 51 is at the L level, and the switch element SW1 is ON. Therefore, the DC voltage PFCVcc from the smoothing capacitor C4 is supplied to the PFC control circuit 44 via the switch element SW1. Therefore, at the timing t2, the voltage supplied to the PFC control circuit 44 becomes the DC voltage PFCVcc.

Next, when the PFC control circuit 44 is activated and a high voltage is applied to the smoothing capacitor C1, the LLC circuit 43 is activated at the timing t3. When the LLC circuit 43 is activated, electric power is supplied to the second side from the first side of the insulating transformer T1, and the DC voltage DCV is output from the power conversion circuit 22A.

At the same time as the DC voltage DCV is output from the power conversion circuit 22, a voltage is generated in the auxiliary winding N2 of the second power supply circuit 47A by the magnetic field generated in the insulating transformer T1. The generated voltage is rectified and smoothed by the diode D6 and the smoothing capacitor C5. This generated and rectified voltage is supplied as the DC voltage LLCVcc at the timing t3. The DC voltage LLCVcc from the smoothing capacitor C5 is supplied to the LLC control circuit 45. Further, the DC voltage LLCVcc from the smoothing capacitor C5 is supplied to the PFC control circuit 44 via the diode D7.

Further, the voltage of the smoothing capacitor C5 is detected by the voltage detection circuit 51, and the control signal from the voltage detection circuit 51 is brought to the H level. As a result, the switch element SW1 is turned off. Therefore, at timing t3, the power supply to the PFC control circuit 44 from the first power supply circuit 46A is stopped. However, as described above, since the direct voltage LLCVcc is supplied from the second power supply circuit 47A to the PFC control circuit 44, the voltage supplied to the PFC control circuit 44 is maintained.

As described above, the power conversion circuit 22A of the second embodiment interrupts/stops the power supply from the first power supply circuit 46A (which has poor conversion efficiency) to the second power conversion circuit 22A by the switch element SW1 during the steady-state operation in which the LLC circuit 43 is activate. Even with such a configuration, the loss in the power conversion circuit 22 can be reduced in a similar manner as in the first embodiment.

Figure 6:
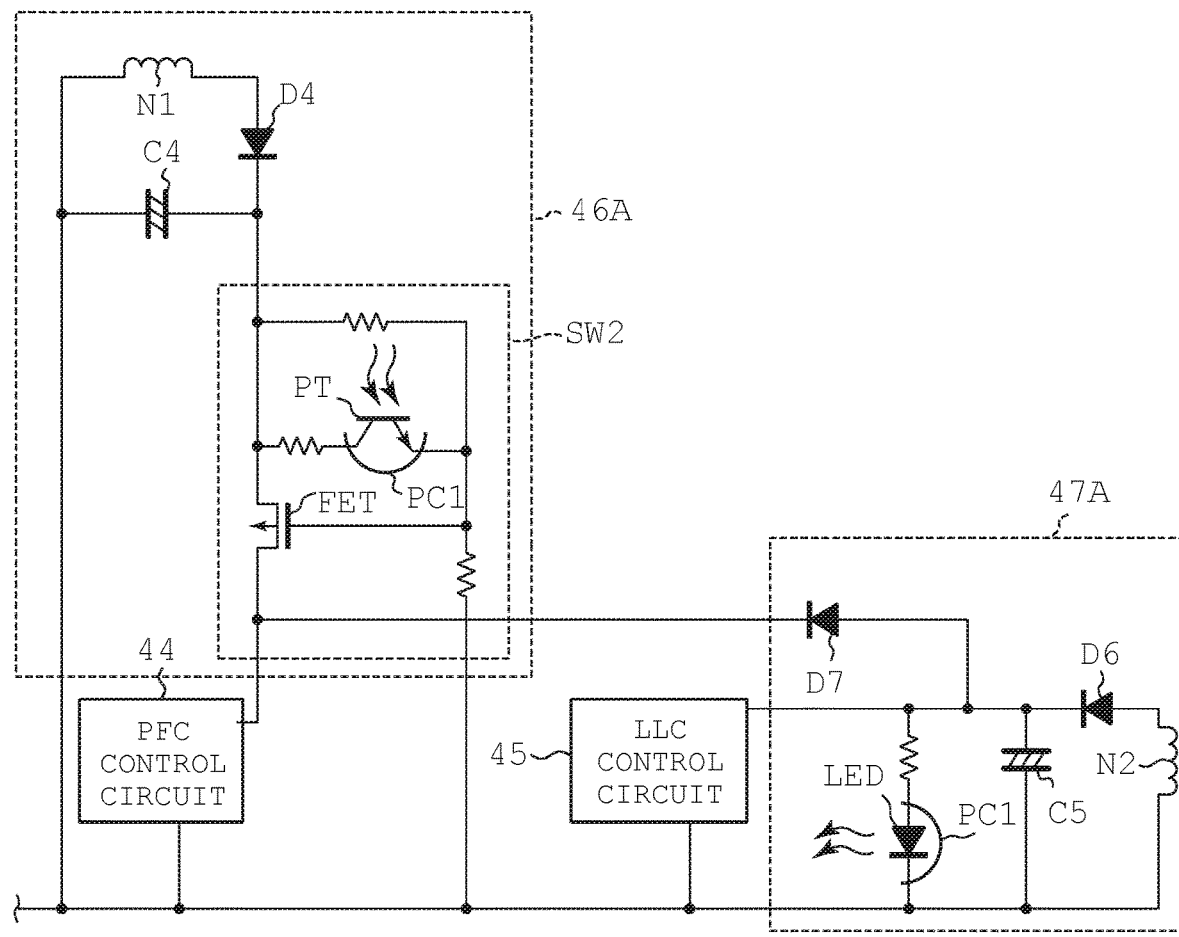
FIG. 6 is a circuit diagram of another power conversion circuit according to the second embodiment.

FIG. 6 is a circuit diagram for explaining a modification example of the switch element SW1. In the example shown in FIG. 6, the first power supply circuit 46A of the first power conversion circuit 22A includes a switch circuit SW2 having a photocoupler PC1 and a field effect transistor FET instead of the switch element SW1.

The switch circuit SW2 is connected between the smoothing capacitor C4 and the PFC control circuit 44, and is a circuit for switching between a state in which the smoothing capacitor C4 and the PFC control circuit 44 are connected to each other, and a state in which the smoothing capacitor C4 and the PFC control circuit 44 are disconnected.

The field effect transistor FET of the switch circuit SW2 is, for example, a normally-on switch. The source of the field effect transistor FET is connected to the high potential side terminal of the smoothing capacitor C4, and the drain of the field effect transistor FET is connected to the PFC control circuit 44. That is, the field-effect transistor FET connects the smoothing capacitor C4 and the PFC control circuit 44 when the field-effect transistor FET is in the on-state, and disconnects the smoothing capacitor C4 and the PFC control circuit 44 when the field-effect transistor FET is in the off-state.

The emitter and collector of the phototransistor PT of the photo coupler PC1 are connected between the source and the gate of the field effect transistor FET. Specifically, the collector of the phototransistor PT of the photocoupler PC1 is connected to the high-potential side terminal of the smoothing capacitor C4, and the emitter thereof is connected to the gate of the field-effect transistor FET.

The anode and the cathode of the light-emitting diode LED of the photocoupler PC1 are connected to a current path through which a current flows due to a voltage generated in the second auxiliary winding N2. Specifically, the anode of the light-emitting diode LED of the photocoupler PC1 is connected to the high-potential terminal of the smoothing capacitor C5, and the cathode thereof is connected to the low-potential terminal of the photocoupler PC1. That is, the light emitting diode LED of the photo coupler PC1 is connected in parallel to the smoothing capacitor C5 of the second power supply circuit 47A. The light emitting diode LED of the photo coupler PC1 emits light by a current flowing when the voltage from the smoothing capacitor C5 exceeds a voltage that can be conducted by the light emitting diode LED.

According to the configuration described above, the field-effect transistor FET is maintained in the ON state until the light emitting diode LED of the photo coupler PC1 emits light. Thus, a state in which the smoothing capacitor C4 and the PFC control circuit 44 are connected to each other is maintained.

When the LLC circuit 43 is activated and a steady-state operation is occurring, the light emitting diode LED of the photo coupler PC1 emits light. When the light-emitting diode LED emits light, the emitter and collector of the phototransistor PT of the photocoupler PC1 become conductive, and the gate-source voltage of the field-effect transistor FET becomes equal to or less than the threshold value of the FET driving voltage. Therefore, the voltage field effect transistor FET is turned off. As a result, the smoothing capacitor C4 and the PFC control circuit 44 are disconnected. As a result, the DC voltage PFCVcc is not supplied from the first power supply circuit 46A to the PFC control circuit 44, and the DC voltage LLCVcc is supplied from the second power supply circuit 47A to the PFC control circuit 44. As a result, as in the first embodiment, the loss in the power conversion circuit 22 can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. A power converter, comprising:
   a first circuit including an inductor and configured to convert an input AC voltage into a first DC voltage and output the first DC voltage;
   a second circuit including an insulating transformer and configured to:
      convert the first DC voltage input to a primary winding of the insulating transformer to a second DC voltage, and
      output the second DC voltage from a secondary winding of the insulating transformer;
   a first control circuit configured to control the first circuit;
   a first power supply circuit including a first winding magnetically coupled to the inductor and configured to output a third DC voltage generated by the first winding to the first control circuit; and
   a second power supply circuit including a second winding magnetically coupled to the insulating transformer and configured to output a fourth DC voltage generated by the second winding to the first control circuit, wherein
   during output of the first DC voltage from the first circuit, the third DC voltage is output from the first power supply circuit to the first control circuit when the second DC voltage is not output from the second circuit, and the fourth DC voltage is output from the second power supply circuit to the first control circuit when the second DC voltage is output from the second circuit.

2. The power converter according to claim 1, wherein the first circuit is a power factor correction (PFC) circuit.

3. The power converter according to claim 1, wherein the second circuit is a DC-DC converter.

4. The power converter according to claim 1, wherein a second control circuit configured to control the second circuit.

5. The power converter according to claim 1, wherein the first power supply circuit includes
   a first diode through which the third DC voltage is output to the first control circuit, and
   a cathode of the first diode is connected to the first control circuit.

6. The power converter according to claim 1, wherein the second power supply circuit includes a second diode through which the fourth DC voltage is output to the first control circuit, and a cathode of the second diode is connected to the first control circuit.

7. The power converter according to claim 1, wherein the fourth DC voltage is greater than the third DC voltage.

8. The power converter according to claim 1, wherein the first power supply circuit includes a normally-on switch that is enabled when the fourth DC voltage is output, and the third DC voltage is output through the normally-on switch.

9. The power converter according to claim 8, wherein the second power supply circuit includes a second diode through which the fourth DC voltage is output to the first control circuit, and a cathode of the second diode is connected to the first control circuit.

10. The power converter according to claim 8, wherein the normally-on switch includes:
    a field effect transistor having a drain connected to the first control circuit, and
    a photocoupler having an emitter, a collector, an anode, and a cathode, the emitter and the collector being connected between a source and a gate of the field-effect transistor, and the anode and the cathode being connected in parallel to the second winding.

11. An image processing apparatus, comprising:
    a printing unit configured to print an image on a sheet; and
    a power converter configured to convert an AC voltage to a DC voltage and output the DC voltage to the printing unit, the power converter including:
    a first circuit including an inductor and configured to convert an input AC voltage into a first DC voltage and output the first DC voltage,
    a second circuit including an insulating transformer and configured to
       convert the first DC voltage input to a primary winding of the insulating transformer to a second DC voltage and
       output the second DC voltage from a secondary winding of the insulating transformer,
    a first control circuit configured to control the first circuit,
    a first power supply circuit including a first winding magnetically coupled to the inductor and configured to output a third DC voltage generated by the first winding to the first control circuit, and
    a second power supply circuit including a second winding magnetically coupled to the insulating transformer and configured to output a fourth DC voltage generated by the second winding to the first control circuit, wherein
    during output of the first DC voltage from the first circuit, the third DC voltage is output from the first power supply circuit to the first control circuit when the second DC voltage is not output from the second circuit, and the fourth DC voltage is output from the second power supply circuit to the first control circuit when the second DC voltage is output from the second circuit.

12. The image processing apparatus according to claim 11, wherein the first circuit is a power factor correction (PFC) circuit.

13. The image processing apparatus according to claim 11, wherein the second circuit is a DC-DC converter.

14. The image processing apparatus according to claim 11, further comprising a second control circuit configured to control the second circuit.

15. The image processing apparatus according to claim 11, wherein the first power supply circuit includes a first diode through which the third DC voltage is output to the first control circuit, and a cathode of the first diode is connected to the first control circuit.

16. The image processing apparatus according to claim 11, wherein the second power supply circuit includes a second diode through which the fourth DC voltage is output to the first control circuit, and a cathode of the second diode is connected to the first control circuit.

17. The image processing apparatus according to claim 11, wherein the fourth DC voltage is greater than the third DC voltage.

18. The image processing apparatus according to claim 11, wherein the first power supply circuit includes a normally-on switch that is enabled when the fourth DC voltage is output, and the third DC voltage is output through the normally-on switch.

19. The image processing apparatus according to claim 18, wherein the second power supply circuit includes a second diode through which the fourth DC voltage is output to the first control circuit, and a cathode of the second diode is connected to the first control circuit.

20. The image processing apparatus according to claim 18, wherein the normally-on switch includes:
- a field effect transistor having a drain connected to the first control circuit, and
- a photocoupler having an emitter, a collector, an anode, and a cathode, the emitter and the collector being connected between a source and a gate of the field-effect transistor, and the anode and the cathode being connected in parallel to the second winding.

* * * * *